July 29, 1924.
T. B. ENTZ
STORAGE BATTERY
Original Filed Dec. 28, 1920
1,503,098
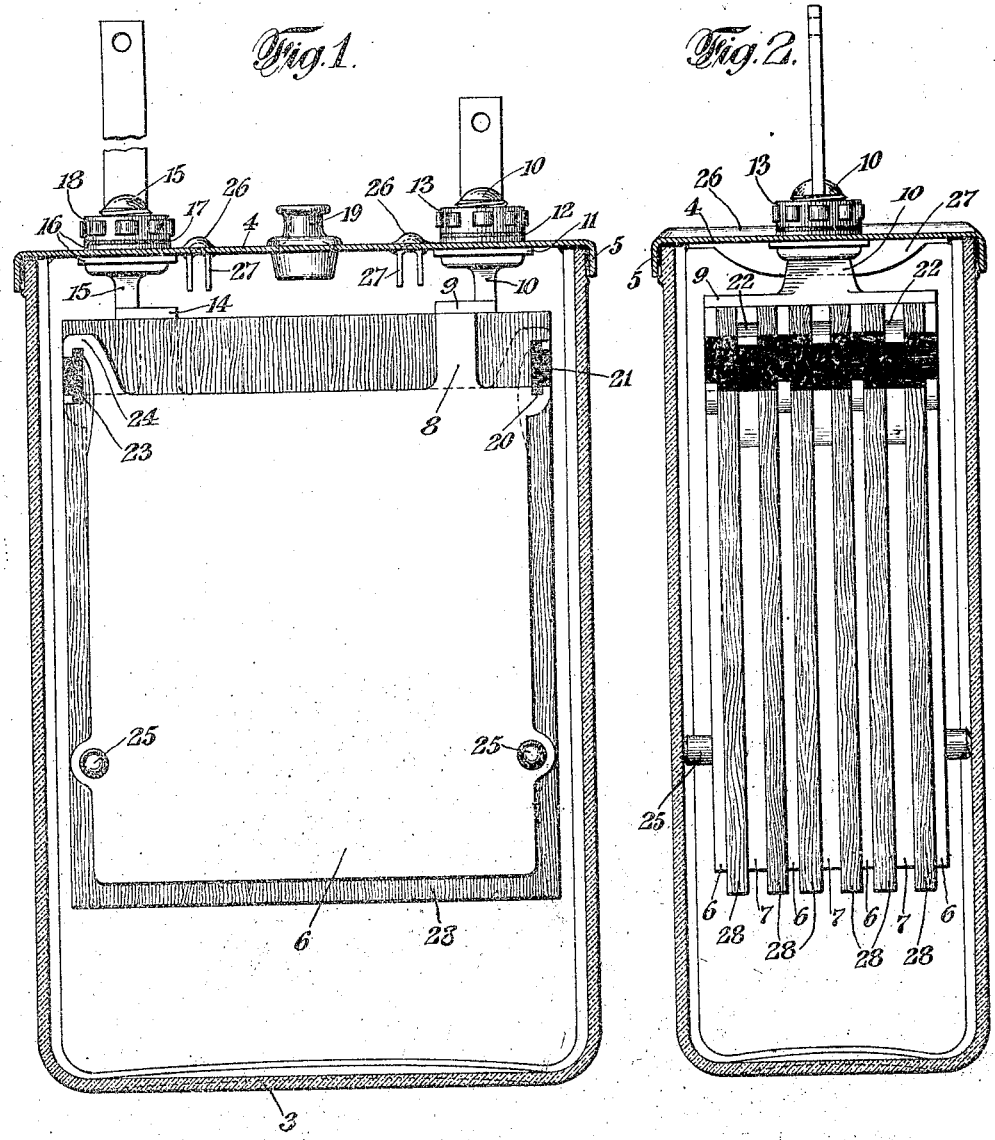
Inventor
Theodore B. Entz
By his Attorney
Gorham Crosby Patented July 29, 1924.

1,503,098

UNITED STATES PATENT OFFICE.

THEODORE B. ENTZ, OF NEW YORK, N. Y., ASSIGNOR TO GOULD STORAGE BATTERY COMPANY, A CORPORATION OF NEW YORK.

STORAGE BATTERY.

Application filed December 26, 1920, Serial No. 433,609. Renewed February 19, 1924.

*To all whom it may concern:*

Be it known that I, THEODORE B. ENTZ, citizen of the United States, and resident of New York city, in the county of New York and State of New York, have invented certain new and useful Improvements in Storage Batteries, of which the following is a specification.

My invention relates to improvements in storage batteries and more particularly to a novel arrangement for supporting the positive and negative plates and separators therein. The main object of the invention is to provide a simple and efficient arrangement by which positive and negative plates supported from the cover of the storage battery cell may have their free ends supported by the terminal ends of plates of opposite polarity by means of insulating members adjacent the top thereof, which insulating members also serve to support the separators near the top thereof.

Further and more specific objects, features, and advantages will more clearly appear from the detail description given below taken in connection with the accompanying sheet of drawings which forms a part of this specification. In the drawings, Fig. 1 is a section through a storage battery cell embodying my improvements in a preferred form thereof and Fig. 2 is a section of the same taken at right angles of Fig. 1.

Referring to the drawings, 3 represents a suitable glass container jar provided with a cover 4 preferably made of an alloy of antimony lead whereby it is acid-resisting. Cover 4 is provided at its edges with a downwardly extending flange 5 between which and the top of the jar 3 is arranged a layer of sealing compound so that the battery may be suitably sealed. 6, 6 represent a plurality or set of negative plates and 7, 7 represent a plurality or set of positive plates. The negative plates are provided with upwardly extending members 8 at their terminal ends which connect with a transverse bus bar 9 in turn integrally connected with a terminal lug 10 which passes through the cover 4. Where it passes through the cover 4 it is surrounded by a soft rubber bushing 11 on top of which is a hard rubber washer 12 and a hard rubber nut 13 is screwed down on the terminal lug 10 in order to hold the parts firmly together. Similarly, at their terminal ends, the positive plates are provided with upwardly extending portions which are integrally connected with a cross bus member 14 which is connected to a terminal lug 15 passing up through the cover and where it passes through the cover, it is surrounded by a soft rubber bushing 16 on top of which is placed a hard rubber washer 17. A hard rubber nut 18 is screwed down on the outside end of the terminal lug 15 in order to hold the parts firmly together. In the center of the cover is arranged an opening for filling the battery which opening is normally closed by a soft rubber vent plug 19. At their terminal ends the negative plates are provided with notches 20 into which extend the lower edge of a member of insulating material such as hard rubber 21 which member extends transversely of the plates. The positive plates at their free end are provided with hooked shaped arms 22 extending upwardly from their upper edges and engaging over the upper edge of their insulating member 21. In this manner the insulating member 21 is supported by the negative plates adjacent the upper edge thereof and in turn supports the free ends of the positive plates. The positive plates are provided with similar notches in their upper edges at their terminal ends and extending into said notches and supported thereby is a transverse member of insulating material 23. The negative plates are provided at their free ends with hooked shaped arms 24 extending upwardly from their upper edges and engaging upwardly over their upper edge of said insulating member 23, so that the insulating member 23 is supported by the positive plates adjacent the upper edge thereof and in turn supports the free end of the negative plates.

28, 28 represent wood separators between adjacent positive and negative plates, which separators are cut away in their side edges adjacent the top thereof and the insulating members 21, 23 pass through said cutaway portions in the side edges of the separators whereby the separators are supported by the plates through said insulating material members.

The outside negative plates 6, 6 are provided with soft rubber buttons 25 projecting laterally from the plates. These buttons 25 are adapted to engage the side of the jar or container to prevent the body portions of the plates from swinging laterally or engaging the sides of the jar or container. In order to stiffen the cover 4 and reduce the sagging thereof due to the weight of the plates supported thereby, the cover may be provided with struck up transverse ribs 26, 26 and if further reinforcing means is desired, reinforcing ribs or bars 27, 27 may be burnt on to or otherwise secured to the underneath side of the cover 4.

While I have described my improvements in great detail and with respect to a preferred embodiment thereof, I do not desire to be limited to such details nor embodiments since various changes and modifications may be made and the invention embodied in other forms without departing from the spirit and scope thereof in its broader aspects.

What I claim as new and desire to secure by Letters Patent, is:

1. A storage battery having in combination a plurality of negative plates, a container for the plates, a cover for the container, means whereby the two sets of plates are suspended and supported from the cover, a member of insulating material extending transversely of the plates and having a part extending into notches in the terminal end of the upper edge of the positive plates, the negative plates being provided at their free ends with hook shaped arms extending upwardly from their upper edges and engaging over the upper edge of said insulating material member to be supported thereby, and another member of insulating material extending transversely of the plates and having a part extending into notches in the terminal end of the upper edge of the negative plates, the positive plates being provided at their free ends with hooked shaped arms extending upwardly from their upper edges and engaging over the upper edge of said second insulating material member, said insulating material members passing through cut away portions in the side edges of the separators adjacent the top thereof whereby the separators are supported by the plates through said insulating material members.

2. A storage battery having in combination a plurality of positive plates, a plurality of negative plates, a container for the plates, a cover for the container, means whereby the two sets of plates are suspended and supported from the cover, a member of insulating material extending transversely of the plates and supported by the terminal end of the positive plates, adjacent their upper edges, the negative plates being provided at their free ends with arms extending upwardly from their upper edges and engaging over the upper edge of said insulating material member to be supported thereby, and another member of insulating material extending transversely of the plates and supported by the terminal end of the negative plates adjacent their upper edges, the positive plates being provided at their free ends with arms extending upwardly from their upper edges and engaging over the upper edge of said second insulating material member, said insulating material members passing through cut away portions in the side edges of the separators adjacent the top thereof whereby the separators are supported by the plates through said insulating material members.

Signed at New York, in the county of New York and State of New York, this 24th day of December, A. D. 1920.

THEODORE B. ENTZ.